US010216600B2

(12) United States Patent
Dixon et al.

(10) Patent No.: US 10,216,600 B2
(45) Date of Patent: Feb. 26, 2019

(54) LINKING SINGLE SYSTEM SYNCHRONOUS INTER-DOMAIN TRANSACTION ACTIVITY

(71) Applicant: International Business Machines Corporation, Armonk, NY (US)

(72) Inventors: Bret William Dixon, South Perth (AU); Scot Dixon, South Perth (AU); Simon Teverey Huband, Carlisle (AU)

(73) Assignee: International Business Machines Corporation, Armonk, NY (US)

( * ) Notice: Subject to any disclaimer, the term of this patent is extended or adjusted under 35 U.S.C. 154(b) by 1526 days.

(21) Appl. No.: 13/754,851

(22) Filed: Jan. 30, 2013

(65) Prior Publication Data

US 2013/0179446 A1    Jul. 11, 2013

Related U.S. Application Data

(63) Continuation of application No. 13/344,385, filed on Jan. 5, 2012, now abandoned.

(51) Int. Cl.
*G06F 17/30* (2006.01)
*G06F 11/30* (2006.01)

(52) U.S. Cl.
CPC ........ *G06F 11/302* (2013.01); *G06F 11/3065* (2013.01)

(58) Field of Classification Search
None
See application file for complete search history.

(56) References Cited

U.S. PATENT DOCUMENTS

| 5,740,355 A | 4/1998 | Watanabe et al. ............... 714/45 |
| 6,883,162 B2 | 4/2005 | Jackson et al. ............... 717/124 |
| 2004/0123293 A1 | 6/2004 | Johnson |

(Continued)

FOREIGN PATENT DOCUMENTS

CN        101983366        3/2011

OTHER PUBLICATIONS

Combined Search and Examination Report for Application GB1300166.4, UK Intellectual Property Office, dated Jul. 1, 2013, 16 pages.

(Continued)

*Primary Examiner* — Tuankhanh D Phan
(74) *Attorney, Agent, or Firm* — VanLeeuwen & VanLeeuwen; Robert Shatto

(57) ABSTRACT

An approach is provided to correlate transaction data occurring at two different domains running on a common operating system image without using static, or common, correlators. Request-type event records are collected at a first domain within the operating system image, with each of the request-type event records including execution identifiers and a unique token that indicates the order in which the corresponding request-type event occurred on the first domain. Similarly, response-type event records are collected at a second domain within the operating system image. The request-type event records are matched with the response-type event records based on the execution identifiers and an overall order that is indicated by unique tokens included in the records. The matching of request-type event records with response-type event records indicate a number of inter-domain transactions which are recorded in a correlation data store.

3 Claims, 6 Drawing Sheets

(56) References Cited

U.S. PATENT DOCUMENTS

| | | | |
|---|---|---|---|
| 2005/0021708 A1 | 1/2005 | Raghuraman et al. | 709/223 |
| 2007/0060367 A1* | 3/2007 | Heler | 463/42 |
| 2007/0294224 A1* | 12/2007 | Heler | 707/3 |
| 2008/0301136 A1* | 12/2008 | De Pauw | G06F 17/30731 |
| 2009/0132704 A1 | 5/2009 | Emuchay et al. | 709/224 |
| 2010/0153835 A1* | 6/2010 | Xiong et al. | 715/230 |
| 2011/0088045 A1 | 4/2011 | Clementi et al. | |

OTHER PUBLICATIONS

Barbosa et al., "Designing and Evaluating Interaction as Conversation: a Modeling Language based on Semiotic Engineering," Departamento de Informática, PUC-Rio, Marquês de São Vicente, 225 / 4o andar RDC, Gávea, Rio de Janeiro, RJ, Brazil—22453-900, Lecture Notes in Computer Science, 2003, 15 pages.

Muhlbauer, "Towards Reproducing Inter-Domain AS Paths," Technische Universitat Munchen, Nov. 15, 2005, 94 pages.

"IBM CISC Transaction Server for z/OS V4.2, further reinforces competitiveness, compliance, and control," IBM Corporation, Apr. 5, 2011, 35 pages.

"IBM Tivoli Business Service Manager," IBM Corporation, 2008, 6 pages.

\* cited by examiner

US 10,216,600 B2

LINKING SINGLE SYSTEM SYNCHRONOUS INTER-DOMAIN TRANSACTION ACTIVITY

TECHNICAL FIELD

The present disclosure relates to an approach that links synchronous transaction activity that occurs in different domains. In particular, the present disclosure links the activity without use of static correlators.

BACKGROUND OF THE INVENTION

Transaction tracking technologies focus on tracking composite applications across multiple technologies, protocols, domains (middleware stacks) and operating systems. Tracking is often achieved by instrumenting targeted software with tracking agents which generate tracking events at strategic points in the application flow. Collected tracking events can be analyzed to determine application metrics and topology.

One of the challenges for transaction tracking is topology building. Making the necessary associations between requests from an application in one domain with the corresponding requests in the adjacent domain can be difficult. For example, a first transaction process running on an operating system may request a service from a second process, such as a queue manager. Transaction tracking needs be able to match the request from the first transaction process with the response from the second process in order to track the interaction between the two processes. Traditional transaction tracking technologies generally employ a correlator to make the association between corresponding inter-domain transaction interactions. A correlator may be passed from the source domain to the target domain (static correlator) or may be generated independently on each domain using common but unique data (dynamic correlator). In either case, matching correlators are used to associate transaction interactions. A problem exists when it is undesirable or not possible to pass a static correlator between domains and when common unique data is not available to generate a dynamic correlator.

SUMMARY

An approach is provided to correlate transaction data occurring at two different domains running on a common operating system image without using static, or common, correlators. Request-type event records are collected at a first domain within the operating system image, with each of the request-type event records including execution identifiers and a unique token that indicates the order in which the corresponding request-type event occurred on the first domain. Similarly, response-type event records are collected at a second domain within the operating system image, with each of the response-type event records also including the execution identifiers and a unique token that indicates the order in which the corresponding response-type event occurred. The request-type event records are matched with the response-type event records based on the execution identifiers and an overall order that is indicated by unique tokens included in the records. The matching of request-type event records with response-type event records indicate a number of inter-domain transactions which are recorded in a correlation data store.

In a further embodiment, an approach is provided that intercepts an inter-domain event that occurs between a first domain and a second domain. The type of the inter-domain event is identified as being either a "request" or a "response" event. Execution identifiers pertaining to the inter-domain event are gathered, such as the system identifier, the process identifier, and the thread identifier. A unique token that indicates an order that the inter-domain event occurred is generated, such as a timestamp-based token. The gathered execution identifiers, generated unique token, and the type of inter-domain event are stored in a data store for future transaction correlation processing with data gathered from another domain.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
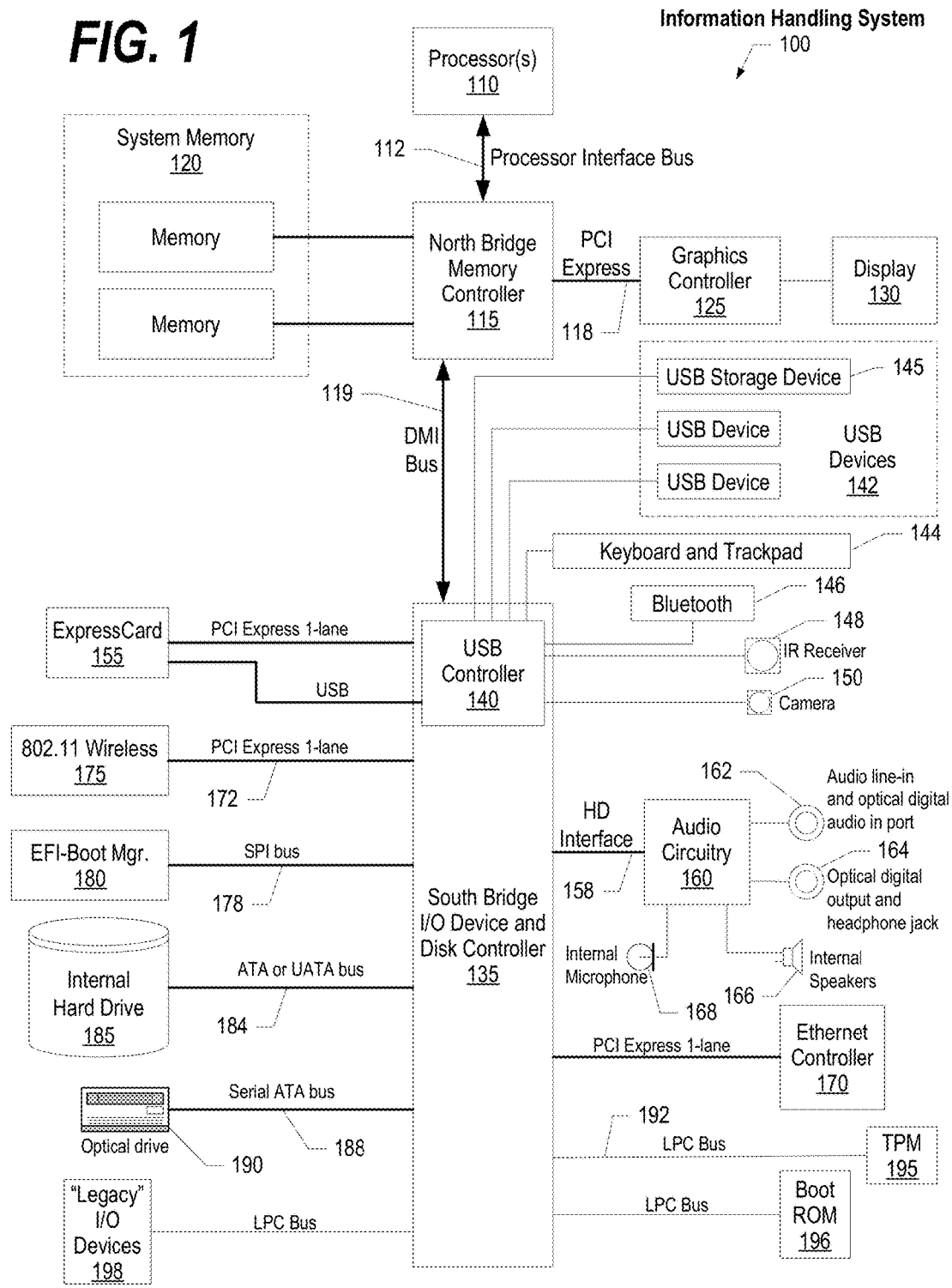
FIG. 1 is a block diagram of a data processing system in which the methods described herein can be implemented.
Figure 2:
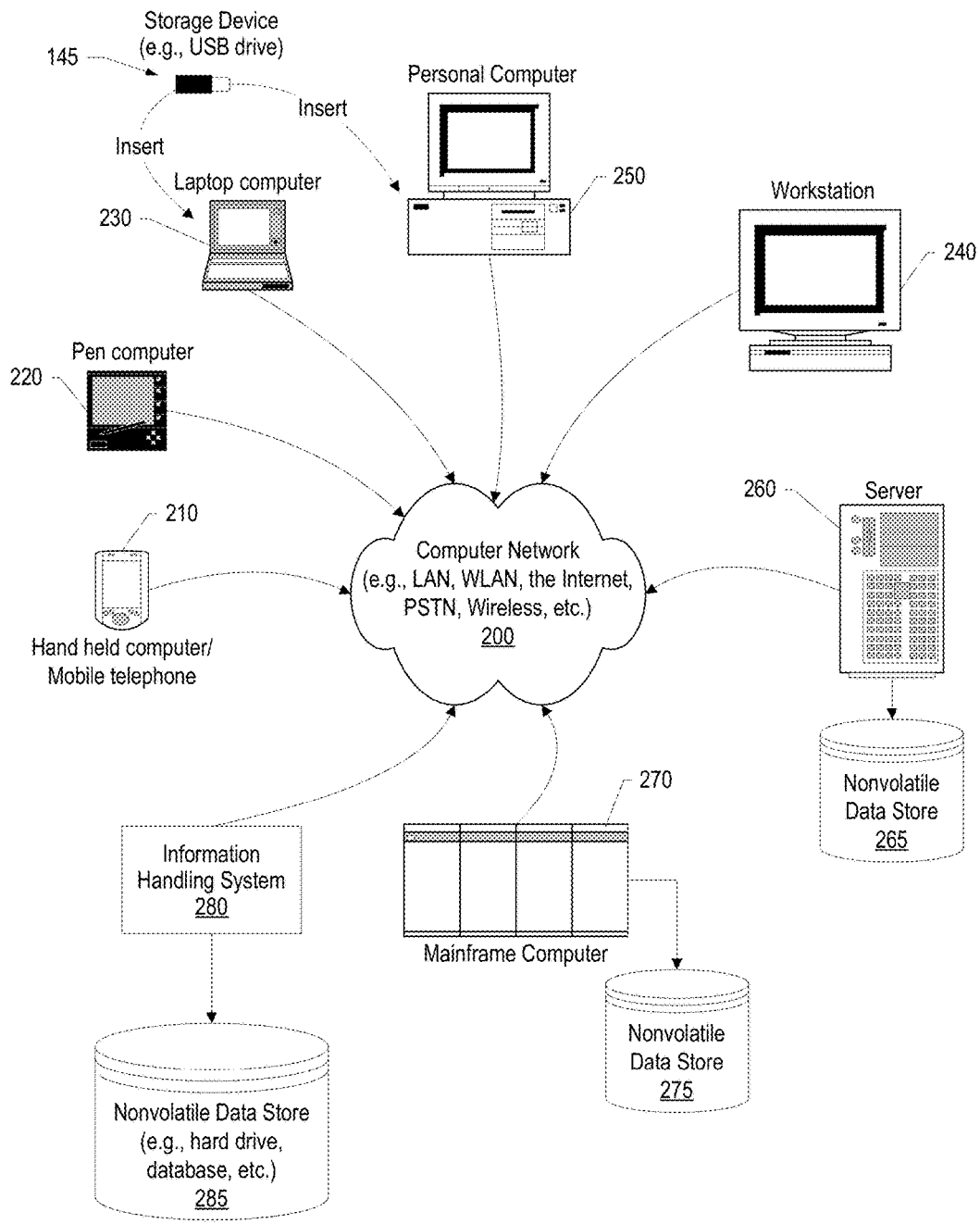
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE .802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
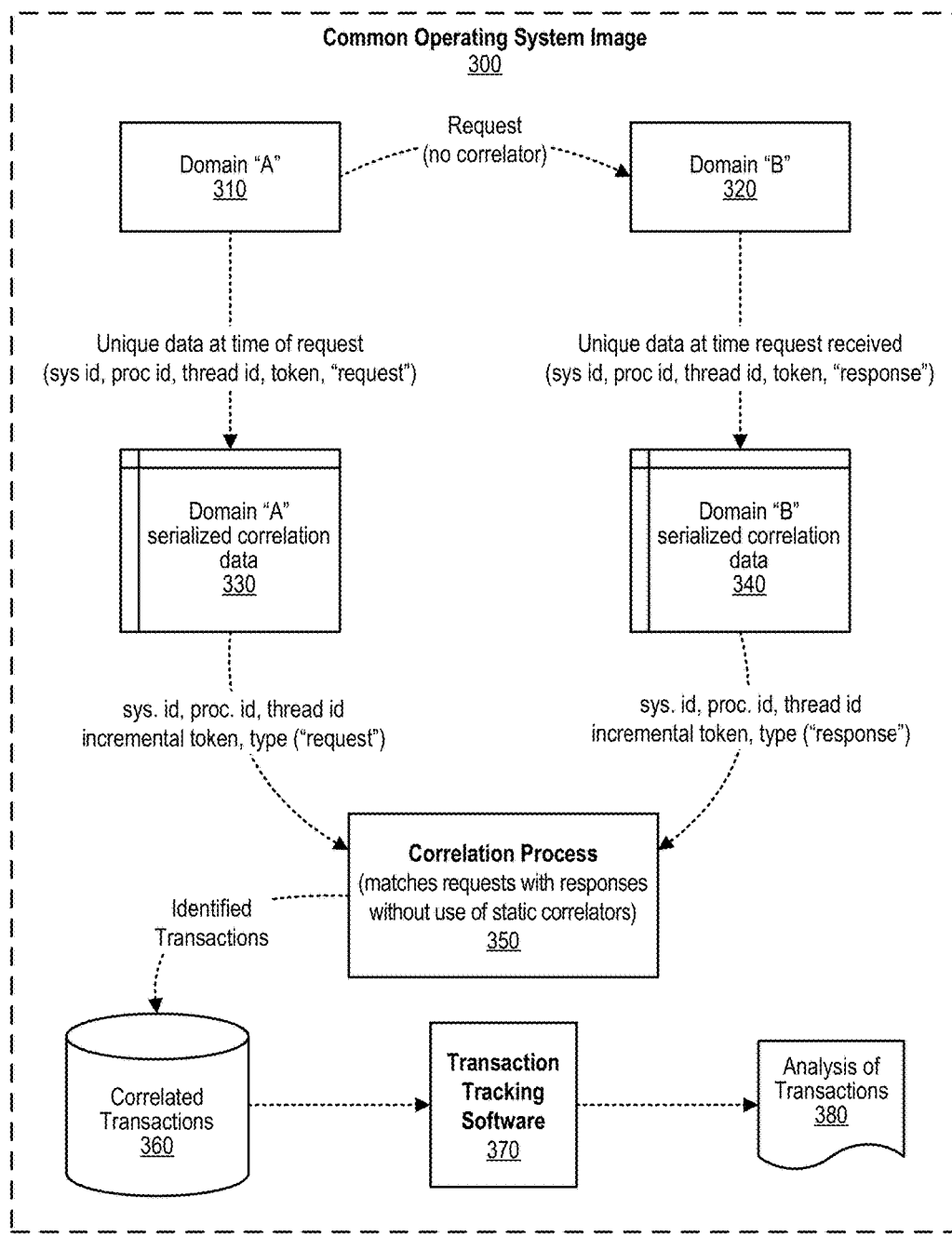
FIG. 3 is a high-level diagram showing instrumentation collecting data at two domains without use of common correlators.

FIG. 3 is a high-level diagram showing instrumentation collecting data at two domains without use of common correlators. Common operating system image 300 executes a number of domains, such as processes, subsystems, applications, and the like. Two such domains are shown being executed by operating system image 300 in FIG. 3. These domains, Domain "A" (310) and Domain "B" (320) are each executing within common operating system image 300 with one, or both, of the domains providing a service, or functionality, to the other domain (e.g., Domain "A" (310) "puts" a request to Domain "B" (320) via an Application Programming Interface ("API") call, etc.). By running in a common operating system image, each of the domains has common execution identifiers with the other domain. These execution identifiers can include a system identifier, a process identifier, a thread identifier, etc.

When tracking transactions through the system, instrumentation is enabled in each of the domains. This instrumentation acts to intercept inter-domain events that occur between the domains (e.g., request events and response events, etc.). In addition, the instrumentation generates a unique token at each domain, such as a timestamp-based token or an incremental token such as an integer counter, etc., that can be used to determine the order in which events occurred. In one embodiment, one of the domains (e.g., Domain "A") is the "requestor" that generates request-type events when requesting services from the other domain and the other domain (e.g., Domain "B") is the responder that provides the service and generates response-type events. Request-type events generate request-type event records by the instrumentation. The request-type event records include the execution identifiers (e.g., a system identifier, a process identifier, a thread identifier, etc.), the type of event (in this case indicating that it is a "request" event), and the unique token that was generated by the requesting domain. Likewise, the responding domain provides the service and generates response-type event records. The response-type event records include the same execution identifiers (e.g., a system identifier, a process identifier, a thread identifier, etc.) as the counterpart response-type event record. However, the type of event now indicates that it is a "response" event, and the unique token is generated at the response domain and is not based on the requestor's unique token per se, however the scheme or algorithm used to generate the responder's unique token can be the same as the scheme or algorithm that was used to generate the requestor's unique token (e.g., a timestamp-based unique token, etc.). The request-type event records generated by the instrumentation running on Domain "A" are stored in data store 330 (e.g., a memory, nonvolatile storage, etc.) which is local to Domain "A". Similarly, the response-type event records generated by the instrumentation running on Domain "B" are stored in data store 340 which is local to Domain "B".

Correlation process 350 is performed to match request-type event records (e.g., generated by Domain "A") with their respective response-type event records (e.g., generated by Domain "B") without the use of any static, or common, correlators or tokens. Instead, the request-type event records are merged with the response-type event records and sorted using the unique tokens that were generated by the instrumentation. The correlation process selects request-type event records from the merged data and then searches for a matching response-type event record (a record with the same execution identifiers) and ensures that there are no intervening request-type event records with the same execution identifiers. When a request-type event record is matched with a response-type event record, the matched pair indicates an inter-domain transaction that is written to correlated transaction data store 360. The correlation process continues to select request-type event records and find their matching response-type event records for as many other records in the merged data that are desired for processing. The resulting inter-domain transaction data are written to correlated transaction data store 360 for eventual analysis.

After the inter-domain transactions have been identified, transaction tracking software 370 analyzes the inter-domain transactions stored in data store 360 and generates one or more analyses of the inter-domain transactions (analysis 380). System administrators and developers can then review the analysis of inter-domain transactions in order to identify bottlenecks or other areas of improvement in either of the domains.

Figure 4:
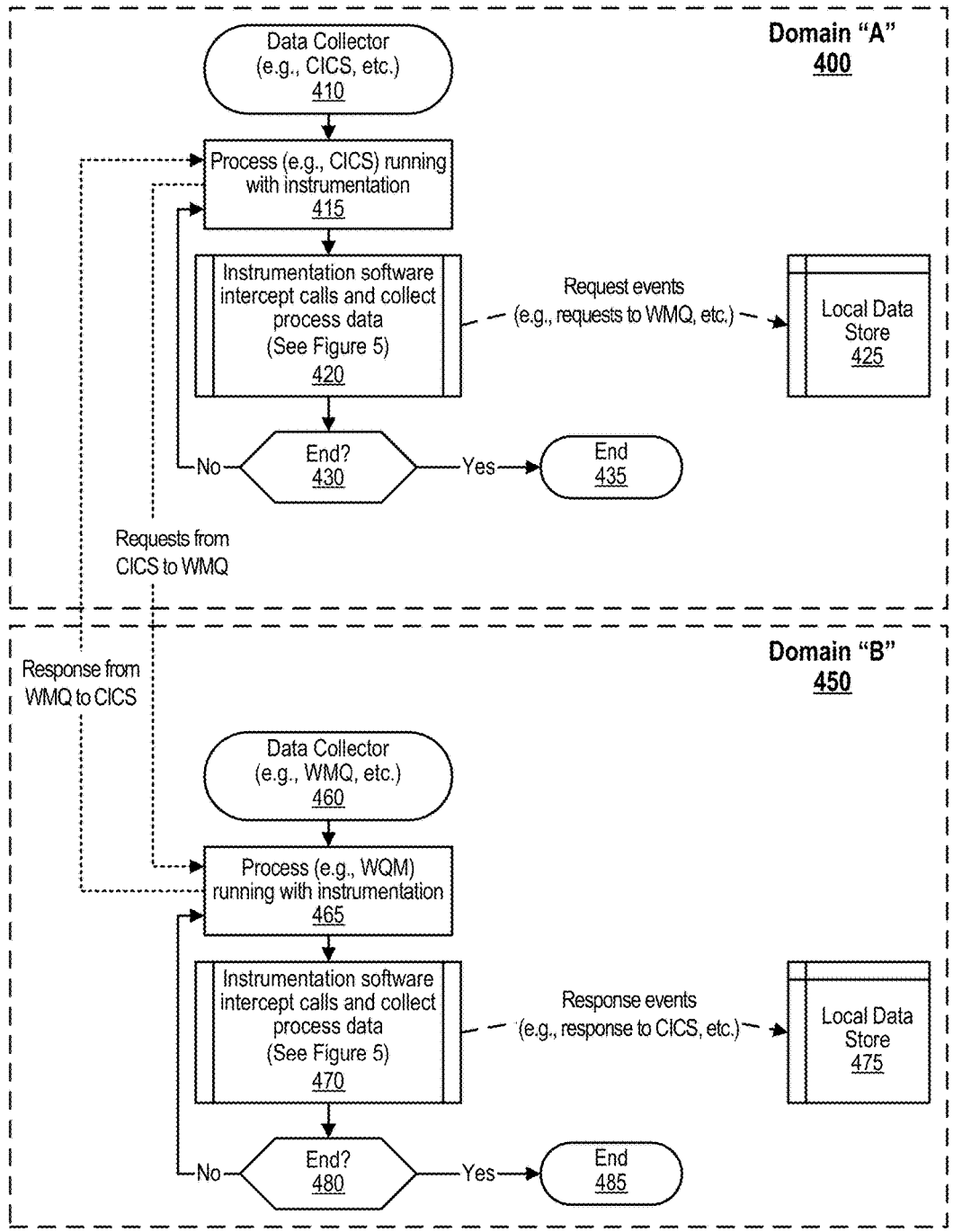
FIG. 4 is a flowchart showing steps taken by processes running on two domains within a common operating system and collecting instrumentation data for future process correlation.

FIG. 4 is a flowchart showing steps taken by processes running on two domains within a common operating system and collecting instrumentation data for future process correlation. In the example shown in FIG. 4, Domain "A" (400) is running a process, such as Customer Information Control System™ (CICS) distributed by International Business Machines Corporation, and Domain "B" (450) is running another process, such as WebSphere Messaging Queue™ (WMQ) also distributed International Business Machines Corporation.

Domain "A" has a data collector that collects process information when instrumentation is enabled. Likewise, Domain "B" also has a data collector that collects process information when instrumentation is enabled. Processing by Domain "A" data collector commences at 410 whereupon, at step 415, the domain runs a process (such as CICS™) with instrumentation enabled. At predefined process 420, the instrumentation software intercepts inter-domain events (e.g., API calls, etc.) and collects relevant process data (see FIG. 5 and corresponding text for processing details). The collected data (e.g., request-type event records, etc.) are stored in local data store 425 which is a memory area local to Domain "A." A decision is made as to whether processing has ended or terminated (decision 430). If processing has not ended, then decision 430 branches to the "no" branch which loops back to continue running the process (e.g., CICS™, etc.) and continue collecting the relevant process data. This looping continues until process ends, at which point decision 430 branches to the "yes" branch and processing by the data collector running on Domain "A" ends at 435.

Turning now to response-type event handling, processing by Domain "B" data collector commences at 460 whereupon, at step 465, the domain runs a process (such as WMQ™) with instrumentation enabled. At predefined process 470, the instrumentation software intercepts inter-domain events (e.g., response events resulting from WMQ handling the request from CICS, etc.) and collects relevant process data (see FIG. 5 and corresponding text for processing details). The collected data (e.g., response-type event records, etc.) are stored in local data store 475 which is a memory area local to Domain "B." A decision is made as to whether processing has ended or terminated (decision 480). If processing has not ended, then decision 480 branches to the "no" branch which loops back to continue running the process (e.g., WMQ™, etc.) and continue collecting the relevant process data. This looping continues until process ends, at which point decision 480 branches to the "yes" branch and processing by the data collector running on Domain "B" ends at 485.

Figure 5:
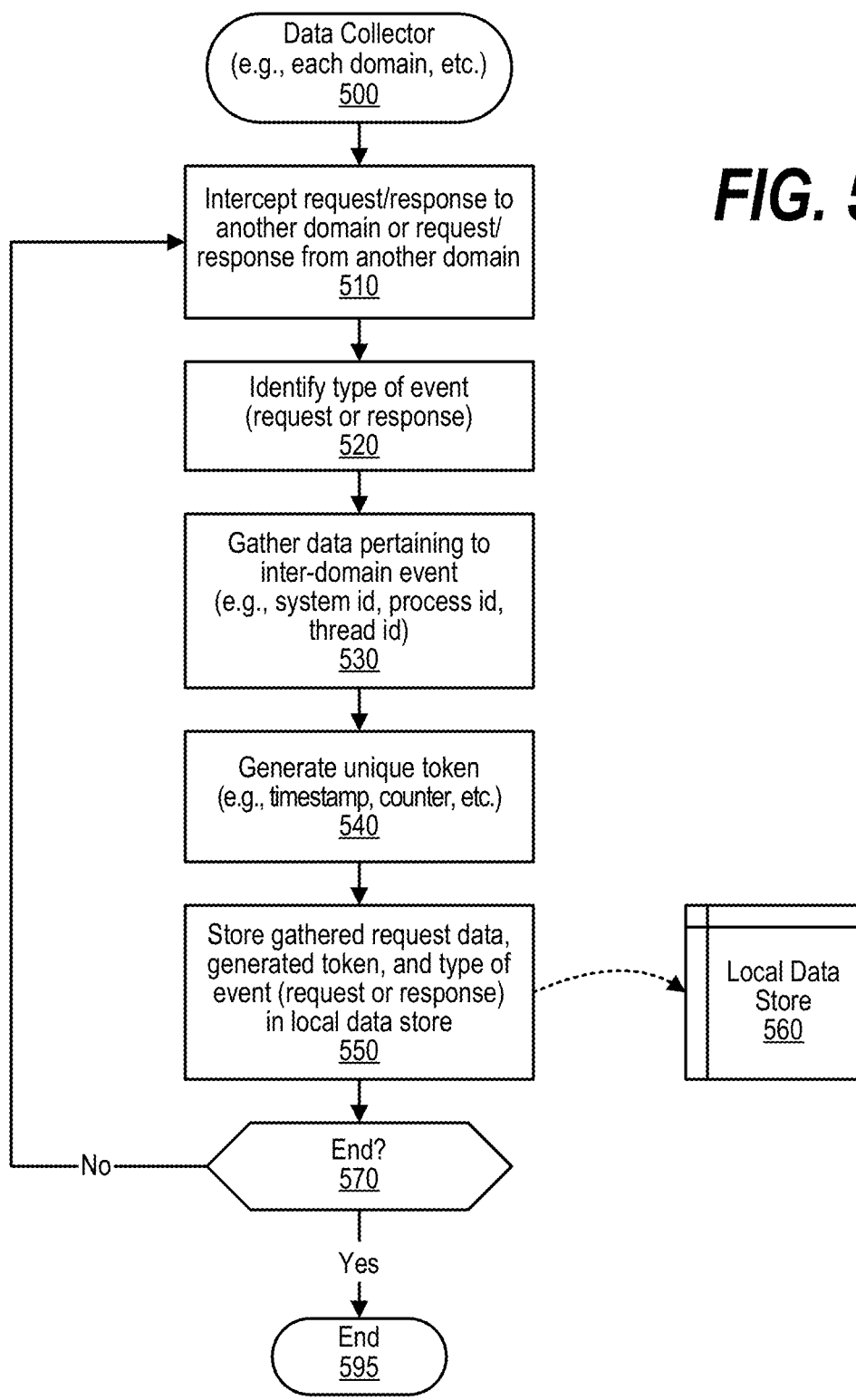
FIG. 5 is a flowchart showing steps performed by data collector process running on each domain.

FIG. 5 is a flowchart showing steps performed by data collector process running on each domain. Data collection processing commences at 500. As shown, in one embodiment the data collection processing runs on each domain where instrumentation has been enabled. At step 510, the data collector intercepts an inter-domain event such as a request (call) to another domain from this domain or a response to another domain by this domain. At step 520, the type of event is identified (e.g., a request-type event, a response-type event, etc.). At step 530, data pertaining to the inter-domain event is gathered with this data forming an execution identifier. In one embodiment, the execution identifier is formed from one or more identifiers such as the system identifier, the process identifier, and the thread identifier. For a given transaction, the execution identifier is the same on both the requesting domain as well as the responding domain. At step 540, a unique token is generated with the token indicating an order in which inter-domain events occurred (e.g., timestamp-based token, incremented integer based token, etc.). At step 550, the gathered request data that forms the execution identifier is stored along with the type of the event (request or response) as well as the generated unique token. This data is stored in local data store 560, such as a memory area, that is local to the domain that is running the data collector process.

A decision is made as to whether data collector processing is being terminated on this domain (decision 570). If data collector processing is not being terminated on this domain, then decision 570 branches to the "yes" branch which loop back to continue intercepting inter-domain requests and responses and storing the relevant data as described above. This looping continues until data collector processing is being terminated on this domain, at which point decision 570 branches to the "yes" branch whereupon data collector processing ends at 595.

Figure 6:
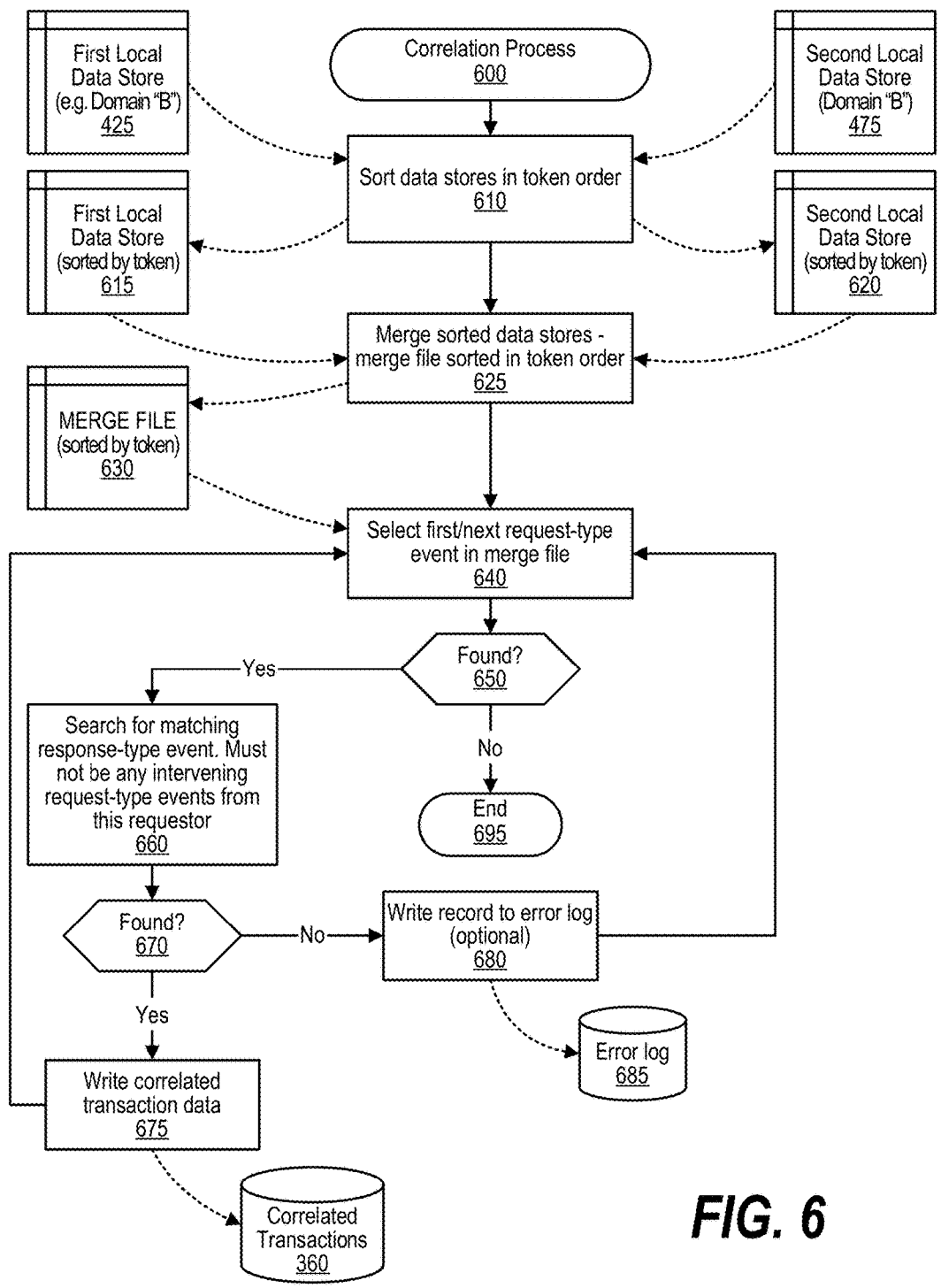
FIG. 6 is a flowchart showing steps performed by the correlation process to correlate the instrumentation data gathered during execution of processes running on the domains of the operating system.

FIG. 6 is a flowchart showing steps performed by the correlation process to correlate the instrumentation data gathered during execution of processes running on the domains of the operating system. Correlation process commences at 600 whereupon, at step 610 the local data stores are sorted based on the unique tokens included in the event records if they are not already sorted (e.g., first local data store 425 is sorted by the unique tokens resulting in sorted first local data store 615 and second local data store 475 is sorted by the unique tokens resulting in sorted second local data store 620). At step 625, the sorted event records are merged with the resulting merge file (630) also being sorted based on the unique token included in each event record. Resulting merge file 630 is then processed to identify the inter-domain transactions as discussed below.

At step 640, the first request-type event record in merge file 630 is selected. In one embodiment, an indicator was inserted in each event record indicating whether the event corresponded to a request or a response. A decision is made as to whether an request-type event record was found in merge file 630 (decision 650). If a request-type event record was found in merge file 630, then decision 650 branches to the "yes" branch whereupon, at step 660, the process searches for a matching response-type event record (e.g., a response-type record with the same execution identifier). In addition, at step 660, the correlation process ensures that there were not any addition (intervening) request-type events with the same execution identifier that occurred before the response-type record was found. A decision is made by the correlation process as to whether a valid response-type event record was found before any intervening request-type event records were encountered (decision 670). If a valid response-type event record was found, then the request-type event record and the matched response-type event record indicate an inter-domain transaction. In this case, decision 670 branches to the "yes" branch whereupon, at step 675, the inter-domain transaction data is written to correlated inter-domain transactions data store 360. Inter-domain transaction data can include the execution identifiers as well as timing data that indicates when the request was made by the requesting domain as well as when the response was sent by the responding domain. Processing then loops back to step 640 to select the next request-type event record from merged data store 630.

Returning to decision 670, if a valid response-type record was not found (e.g., an intervening request-type event record was encountered, no response was found, etc.), then decision 670 branches to the "no" branch whereupon, at step 680, a record of the error can be written to error log data store 685 to indicate the request-type event record for which no valid response-type event record was found. Processing then loops back to step 640 to select the next request-type event record from merged data store 630.

At step 640, the next request-type event record is selected from merge file data store 630 and the processing described above searches for a matching response-type event record. This looping continues until all request-type event records have been processed, at which point decision 650 branches to the "no" branch and processing ends at 695.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system comprising:

intercepting an inter-domain event between a first domain and a second domain, wherein the first and second domains are running within a common operating system image, and wherein a first data collector in the first domain generates corresponding execution identifiers for events originating within the first domain and a second data collector in the second domain generates corresponding execution identifiers for events originating within the second domain;

identifying a type of the inter-domain event;

gathering one or more selected execution identifiers pertaining to the inter- domain event, wherein the execution identifiers include a system identifier, a process identifier, and a thread identifier;

generating a unique token that indicates an order that the inter-domain event occurred when compared with a plurality of unique tokens corresponding to other inter-domain events; and storing the gathered selected execution identifiers, the generated unique token, and the type of inter-domain event in a data store.

2. The method of claim 1 wherein the intercepting, identifying, gathering, generating, and storing are included in an instrumentation routine and are performed when instrumentation is enabled.

3. The method of claim 1 wherein the generated unique token is based on a timestamp.

* * * * *